US 11,286,365 B2

(12) United States Patent
Christel

(10) Patent No.: US 11,286,365 B2
(45) Date of Patent: Mar. 29, 2022

(54) PROCESS FOR RECYCLING POLYOLEFINS

(71) Applicant: POLYMETRIX AG, Oberbüren (CH)

(72) Inventor: Andreas Christel, Zuzwil (CH)

(73) Assignee: POLYMETRIX AG, Oberbüren (CH)

( * ) Notice: Subject to any disclaimer, the term of this patent is extended or adjusted under 35 U.S.C. 154(b) by 106 days.

(21) Appl. No.: 16/803,227

(22) Filed: Feb. 27, 2020

(65) Prior Publication Data
US 2020/0291200 A1     Sep. 17, 2020

(30) Foreign Application Priority Data

Mar. 15, 2019  (EP) .................................... 19163075

(51) Int. Cl.
*C08J 11/06*    (2006.01)

(52) U.S. Cl.
CPC ............ *C08J 11/06* (2013.01); *C08J 2357/00* (2013.01)

(58) Field of Classification Search
CPC ..... B29B 2009/168; B29B 9/065; B29B 9/16; C08J 11/06; C08J 2323/00; C08J 2357/00; F26B 3/08; F26B 5/08; Y02W 30/62
See application file for complete search history.

(56) References Cited

U.S. PATENT DOCUMENTS

| 5,767,230 | A | 6/1998 | Scarola et al. |
| 6,042,260 | A | 3/2000 | Heidemeyer et al. |
| 6,914,035 | B2 | 7/2005 | Ziemer et al. |
| 9,028,734 | B2 | 5/2015 | Hallaji |
| 9,346,191 | B2 | 5/2016 | Hanimann et al. |
| 9,943,817 | B2 | 4/2018 | Christel et al. |
| 2008/0045683 | A1* | 2/2008 | Perna ......................... B01J 8/12 526/279 |
| 2011/0201776 | A1 | 8/2011 | Bruckmann |

(Continued)

FOREIGN PATENT DOCUMENTS

| DE | 195 36 289 A1 | 4/1997 |
| DE | 10 2007 040 135 A1 | 2/2009 |
| EP | 0 541 674 B1 | 5/1993 |

(Continued)

OTHER PUBLICATIONS

European Search Report Corresponding to 19163075.5 dated Aug. 12, 2019.

*Primary Examiner* — Frances Tischler
(74) *Attorney, Agent, or Firm* — Finch & Maloney, PLLC; Michael Bujold; Jay Franklin

(57) ABSTRACT

A process for recycling polyolefins comprising the steps of extruding used polyolefin material, producing granules from the polyolefin material exiting from the extrusion into a liquid cooling medium, separating the cooling medium to obtain a dry polyolefin granulate, and treating the dry polyolefin granulate in a treatment space with a treatment gas, preferably by counter-current flow, immediately after separation of the cooling medium, the dry polyolefin granules still have a granule temperature (T2) which is above a temperature (T1) of the liquid cooling medium and in the range of 71° C.-200° C., preferably 80° C.-160° C., but below the melting point of the granules, and at least 75% of the dry polyolefin granules, in the treatment space, have a dry temperature (T3) which is in the range of granule temperature (T2)±20° C., but below the melting point of the granules.

15 Claims, 2 Drawing Sheets

(56) References Cited

U.S. PATENT DOCUMENTS

Figure 1:
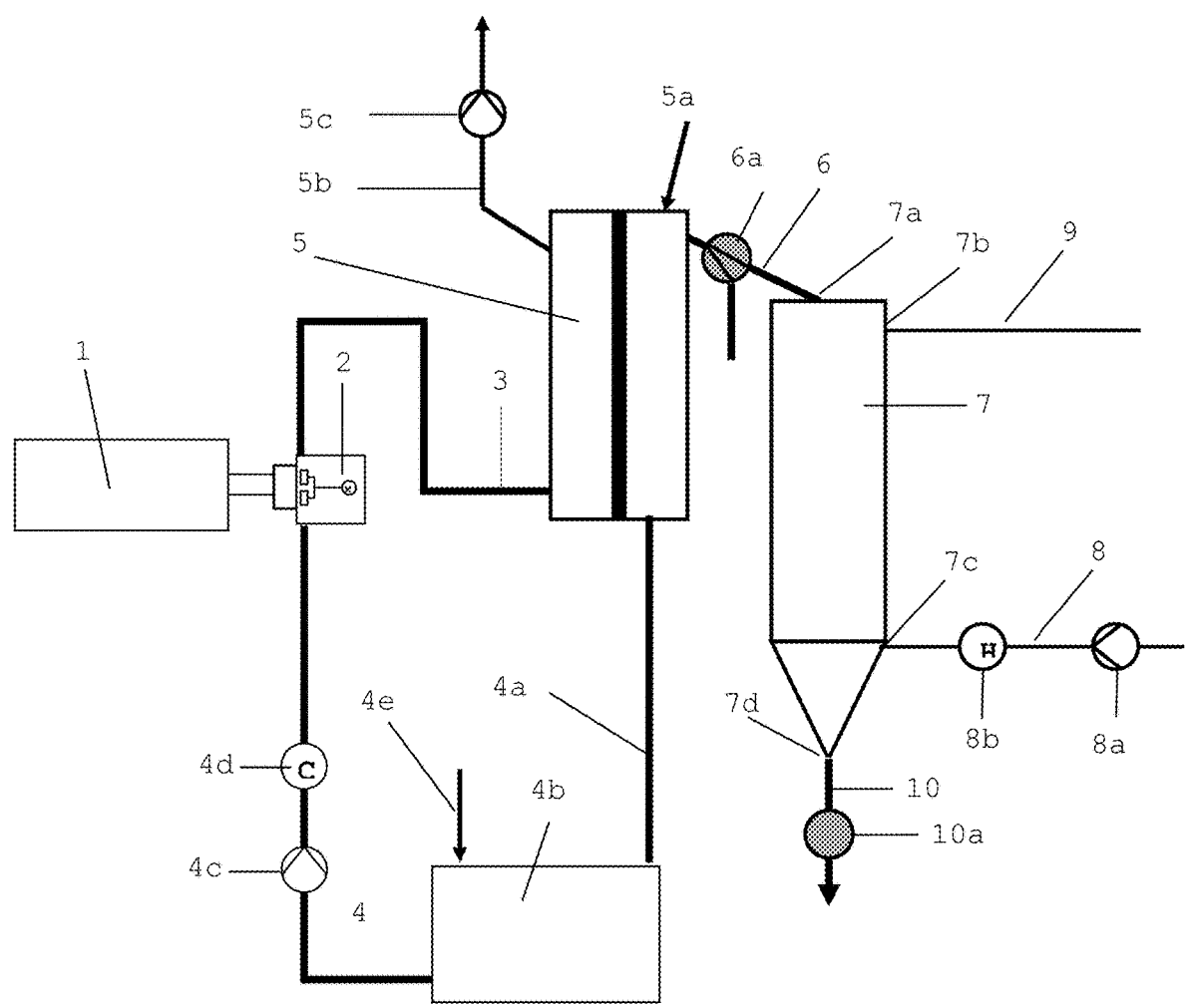

2017/0218119 A1 8/2017 Christel et al.

FOREIGN PATENT DOCUMENTS

| EP | 2 072 203 A1 | 6/2009 |
| EP | 2 433 771 A1 | 3/2012 |
| EP | 2 712 881 A1 | 4/2014 |
| EP | 2 443 771 B1 | 4/2018 |
| EP | 3 363 841 A1 | 8/2018 |
| EP | 3 442 763 B1 | 6/2019 |
| WO | 03/022050 A1 | 3/2003 |
| WO | 2013/072035 A1 | 5/2013 |

* cited by examiner

PROCESS FOR RECYCLING POLYOLEFINS

The present invention concerns an improved process for recycling polyolefins.

For ecological reasons, the recycling of used plastic articles is playing an increasing role. The present invention concerns the recycling of used polyolefin material. This is material that comes from articles that have already been used industrially or privately. Polyolefin material from industrial use is called post-industrial material; polyolefin material from private use is called post-consumer material.

Articles made of polyolefin material are used extensively, with polyethylene and polypropylene in particular being used as polyolefins. For example, reference is made to plastic bags, agricultural foils or plastic bottles or other containers.

The used polyolefin material is usually contaminated with volatile components which the polyolefin material takes up during its use. These volatile components give the polyolefin material an unwanted odour or even toxicity that makes the polyolefin material unsuitable for further use. In order to make the polyolefin material suitable for re-use by recycling, an efficient reduction or preferably complete removal of volatile components from the polyolefin material must be achieved during recycling.

In the U.S. Pat. No. 5,767,230 it was proposed to first comminute the material in a comminuting device such as a granulator to a certain required size and then to remove volatile components by treating it with a hot gas such as air or nitrogen at preferably 90-115° C. for 1 to 15 h.

As described in U.S. Pat. No. 9,028,734 B2, however, this procedure has the disadvantage that only particles of a certain size can be treated in a device that is precisely matched to this particle size. In U.S. Pat. No. 9,028,734 B2 it was therefore proposed to produce the particles to be treated by extrusion and subsequent granulation. Here the extruded granulate was placed in a cooling bath of water and transferred to a treatment reactor with the aid of the water. In this treatment space the granulate was heated with hot air of preferably 90 to 125° C. and freed from volatile components.

Alternatively, in EP-2 072 203 A1 it was proposed to transfer a granulate produced at 40-60° C. by extrusion and subsequent underwater granulation to a treatment reactor where it is heated with, for example, hot water of about 75-100° C. for 15 min to 6 h and freed from volatile components.

According to WO 2013/072 035 A1, however, the use of hot water (or another hot liquid) as a cleaning medium requires a complex cleaning stage. In WO 2013/072 035 A1 it was therefore proposed to produce a granulate-liquid slurry by extrusion and subsequent underwater granulation at 40-60° C. and then to heat it in a treatment space with, for example, steam and to remove volatile components. It was described as an essential aspect of the teaching therein that in the treatment space the combination of the liquid and the vapour present leads to an effective removal of volatile components and, in addition, a drying step in front of the treatment space can be omitted.

The teaching of the state of the art is still not optimal. The introduction of a granulate-water slurry into the treatment space has the disadvantage that when air or another dry gas is used, the water contained in the slurry evaporates, resulting in undesired cooling of the granules.

It was the problem of the present invention to overcome the disadvantages of the state of the art and to provide an improved process for recycling polyolefins.

This problem is solved by the subject-matter of claim 1.
The present invention concerns a process for recycling polyolefins comprising the steps of
a) Extrusion of used polyolefin material
b) Production of granules from the polyolefin material emerging from the extrusion in a liquid cooling medium,
c) Separation of the cooling medium to obtain a dry polyolefin granulate
d) Treatment of the dry polyolefin granulate in a treatment space with a treatment gas, preferably in countercurrent flow,
characterized in that the process is carried out in such a way that the dry polyolefin granules, directly after separation of the cooling medium in step c), still have a temperature $T2$ which is above a temperature $T1$ of the liquid cooling medium in step b) and in the range 71° C.-200° C., preferably 80° C.-160° C., but below the melting point of the granules, and at least 75% of the dry polyolefin granules in the treatment space have a temperature $T3$ which is in the range $T2\pm20°$ C., but below the melting point of the granules.

According to the present invention, it was surprisingly found that an efficient and energetically advantageous removal of volatile components from polyolefin material is possible if the production of a polyolefin granulate from used polyolefin material is achieved by introducing a polyolefin material emerging from extrusion into a hot liquid cooling medium followed by rapid separation of the polyolefin granulate from the liquid cooling medium, wherein the liquid cooling medium here preferably has a temperature $T1$ in the range from 50 to 100° C., preferably 70 to 100° C., even more preferably 75 to 95° C. and in particular preferably 80 to 90° C. According to the present invention, the preferred cooling medium is water.

In this way, the polyolefin granules thus produced retain a temperature required for the subsequent treatment stage; energetically disadvantageous heating of the polyolefin granules by the cleaning gas in the treatment stage, as required by the state of the art discussed above, is therefore unnecessary.

Furthermore, in accordance with the present invention, it was found that, contrary to the teaching of WO 2013/072 035 A1, it is advantageous not to introduce a granulate-water slurry into the treatment space for removing volatile components, but rather dry polyolefin granules. In accordance with the present invention, it was found that the presence of water in the treatment space, as described in WO 2013/072 035 A1, is not necessary for efficient removal of volatile components. According to the present invention, the disadvantages associated with the presence of water in the treatment space (undesired cooling of the granules due to evaporation of water when using air or another dry gas in the treatment space) can thus be overcome.

According to the present invention, the polyolefin granulate is thus quickly separated from the liquid cooling medium from the granulation stage after its production, so that immediately after the separation of the cooling medium, it has a temperature $T2$ which is above the temperature $T1$ of the liquid cooling medium. In other words, the separation of the liquid cooling medium from the granulation stage takes place within a few seconds, preferably not more than 10 s, after the polyolefin material has come into contact with the liquid cooling medium after leaving the extruder.

This ensures that at least 75% of the dry polyolefin granules in the treatment space have a temperature $T3$, which is within a range of $T2\pm20°$ C., but below the melting point of the granules. Of course, the polyolefin material must not melt during the treatment stage. In other words, the polyolefin granules in the treatment space have the temperature required for efficient removal of volatile components with the aid of a gas such as air due to the previous process steps alone, without the need to heat the polyolefin granules in the treatment space. The process according to the present invention is therefore energetically efficient.

The present invention concerns the recycling of used polyolefin material.

According to the present invention, a used material is understood to be a material which has already been used at least once industrially or privately. Polyolefin material from industrial use is called post-industrial material; polyolefin material from private use is called post-consumer material.

A polyolefin is a polymer produced by polymerizing olefin monomers (i.e. alkenes). Industrially, mainly polyolefins composed of $C_2$-$C_{10}$ alkenes are relevant. Polyolefins based on ethene (i.e. polyethylene) or propene (i.e. polypropylene) are particularly preferred. The polyolefins to be treated by the process according to the present invention may be homopolymers or co-polymers of the monomers mentioned above.

The production of polyolefins is conventionally known (e.g. the Ziegler-Natta process) and does not need to be explained in detail here. Typically, the alkene monomers are polymerized in the presence of suitable catalysts.

The present invention concerns the efficient separation of used polyolefin material from volatile components. These volatile components are taken up by the polyolefin material during its use, for example by absorption or diffusion.

Used polyolefin materials are, for example, containers used in the health and personal care sector, containers for cleaning agents and beverages, such as milk, water or fruit juices, or containers and trays for solid or pasty foodstuff, such as yoghurt or instant meals, wherein the volatile components may be naturally occurring or added flavouring substances, residues of the filling goods, degradation products of the filling goods as well as degradation products of the polyolefin material. Furthermore, volatile substances comprise substances that have been in contact with and taken up by the polyolefin material during the preceding steps of recirculation, sorting and processing.

Furthermore, the used polyolefin material may be, for example, foils from the household or agricultural sector, in which case the volatile components may be substances transferred from adherent products, such as food waste, soil or fertilizers.

According to the present invention, a volatile component is understood to be a substance which can escape from the polyolefin material by diffusion under storage conditions of −60° C. to 60° C. Usually such substances have a molecular weight of 30 to 300 g/mol and under atmospheric pressure a boiling point of −60° C. to 360° C., preferably less than 280° C. and especially preferred less than 230° C. In particular, the volatile components are low-molecular substances with 1 to 30 carbon atoms, preferably 1 to 20 carbon atoms, more preferably 1 to 15 carbon atoms and especially preferably 2 to 12 carbon atoms. Examples of volatile compounds are corresponding hydrocarbons, alcohols or terpenes such as limonene, amines or thiols.

Before carrying out the process according to the present invention, the used polyolefin material may preferably be subjected to a pretreatment. For example, pretreatment is selected from the group consisting of sorting by colour, sorting by polymer type, size reduction, surface cleaning such as washing, pre-drying, and combinations thereof. These pre-treatment steps are conventionally known. Sorting by colour can be carried out manually or preferably with appropriate sorting machines (such as machines operating according to the Sortex® technology). Sorting by polymer type can be carried out, for example, by means of a density separation as in a swim-sink basin. Comminution can be carried out in well-known comminuting machines such as a granulation device. A surface cleaning can be carried out with known solvents (cold or hot water, organic solvents), which may be mixed with surface-active substances (such as soaps or non-ionic surfactants).

A particularly preferred embodiment provides for the fact that, through purposive collection and sorting of the polyolefin material to be cleaned according to the present invention, more than 95%, in particular 99 to 100%, originates from polyolefin bottles, containers or trays for food, wherein the polyolefin material cleaned according to the present invention can be reused in direct contact with food.

Depending on the type and degree of soiling or contamination of the used polyolefin material, one or more of the above mentioned pretreatments can be carried out. However, if the material is only slightly contaminated, pre-treatment may not be necessary.

The used polyolefin material, which may have been pre-treated as described above, is melted in an extruder. According to the present invention, conventional single-shaft, twin-shaft or multi-shaft extruders can be used for this purpose. A suitable twin-screw extruder is described in DE 195 36 289 C2, for example. A usable multi-shaft extruder such as a ring-shaped 12-shaft extruder is described for example in WO 03/022050 A1.

The used polyolefin material, which may have been pretreated as described above, is introduced in solid state into an inlet opening of the extruder, where it is melted by heating.

According to a preferred embodiment, predrying and/or degassing can be performed during heating of the polyolefin material by maintaining the material in a dryer before the extruder or in a first section of the extruder for a predetermined time at a temperature below the melting temperature. The dryer and/or extruder preferably has an outlet for escaping volatile components in this area. According to a preferred embodiment of the present invention, this predrying and/or degassing can be carried out under reduced pressure and/or with the addition of an inert gas. In this case, the extruder has the necessary units (vacuum pump or gas inlet and outlet). Alternatively, degassing can also be carried out only after the polyolefin material has been melted. In this case, melt degassing can also be carried out under reduced pressure and/or with the addition of an inert gas. In this case, the extruder has the necessary units (vacuum pump or gas inlet and outlet).

According to a preferred embodiment, the molten polyolefin material can also be purified by melt filtration to remove impurity particles. A melt pump is preferably used to build up the necessary pressure. These steps and the components required for them are known to the skilled person.

Single polymer strands are formed from the polyolefin melt in an outlet device from the extruder, in particular a die or die plate. For the production of granules (i.e. particles of defined shape and size) from the polymer strands, the granulation techniques known in the state of the art, such as strand granulation, water ring granulation, underwater granulation or head granulation (also hot face granulation) can be used. In this process, the polymer strands emerging from the melt channels are solidified and separated into a large number of individual granules, wherein the separation can take place before or after solidification. Separation is achieved, for example, by independent drop formation, by the use of a liquid shearing medium or by mechanical separation, especially cutting. While droplets are formed at the die outlet either independently or forced by a shearing medium, cutting can take place either directly at the die outlet or only after passing through a treatment section.

Solidification of the polyolefin melt is achieved by cooling with the aid of at least one liquid cooling medium or a combination of different liquid cooling media. As liquid cooling media there are particularly suitable liquids which have a high specific heat capacity, preferably of more than 2 kJ/(kg·K) and a sufficiently high boiling point, preferably higher than 90° C., and which do not substantially attack or alter the polyolefin and do not leave toxic residues in the polyolefin. According to the present invention, a single liquid cooling medium is preferred. Preferred are water or ethylene glycol or their mixtures. Water is particularly preferred as a cooling medium.

According to the present invention, the preferred temperature of the liquid cooling medium on entering the granulation device is at least 50° C., preferably at least 70° C., but below its boiling point. In the case of water, the temperature of the cooling medium at normal pressure according to this embodiment is therefore 50° to 100° C., more preferably 70° C. to 100° C., even more preferably 75° C.-95° C., and particularly preferably 80° C.-90° C. Due to the pressure dependence of the boiling point, the suitable temperature of the liquid cooling medium increases with increased pressure in the liquid system. At lower pressure the suitable temperature is reduced, which is also the case in open systems with low external pressure.

According to the present invention, the preferred method of granulation is strand granulation or underwater granulation, wherein underwater granulation is particularly preferred.

With underwater granulation, the granulation takes place under water. The granulate particles obtained are simultaneously cooled in the underwater granulator. However, as explained above, the cooling must not be so strong that the granulate particles are cooled below the temperature required for the subsequent treatment in the treatment space. This can be achieved, for example, by using heated water, which has a temperature at normal pressure of 50° C. to 100° C., preferably 70° C. to 100° C., more preferably 75° C.-95° C., and particularly preferably 80° C.-90° C., and by rapid separation of the polyolefin granules formed from the liquid cooling medium. In addition, the granules may only come into contact with the liquid cooling medium for a short time. According to the present invention, the contact time of granulate and liquid coolant is a few seconds, preferably at most 10 s, particularly preferably 0.1 to 3 s and especially preferably 0.2 to 1.5 s.

The granules produced in this way should preferably have a defined granule shape, such as cylindrical, spherical, drop-shaped, lenticular, sphere-like or a design shape as proposed for example in EP0 541 674. The average granule size should between 0.1 mm and 10 mm, preferably between 0.5 mm and 3.5 mm and especially preferred between 0.85 mm and 3 mm. Average pellet size is the statistical mean value of the average pellet diameter, which is the average of granule height, length and width (measurable by known methods). The granule size distribution should be kept within a narrow spectrum. Preferably the standard deviation of the granule weights of 100 measured granules is between 2 and 20%.

The granulate is then transferred via a connecting line to a unit for drying the granulate (separating device for separation from the cooling medium). To avoid excessive cooling of the pellets, they should be led out of the granulator and through the connecting line as quickly as possible. Preferably, the flow velocity in the connecting line can be increased by introducing a gas stream (preferably air).

The granules are separated from a liquid cooling medium in a treatment space by means of separating devices known in the state of the art as drying devices. These can be merely passive separating devices, such as grids or grates, through which the cooling medium, but not the granulate, can pass. Usually active separating devices are used for at least part of the separation, wherein separation may occur due to gas flow, centrifugal force, impact, evaporation or combinations thereof. Such devices are known, for example, as suction devices, impact dryers or centrifugal dryers. Separation can be assisted by feeding a gas flow into the separating device, wherein the gas flow optionally comprises heated or dried gas, in particular air. A centrifugal dryer with air supply is preferred.

According to a preferred embodiment of the present invention, for the accelerated evaporation of liquid cooling medium a temperature in the range of 80 to 160° C., preferably 90° C. to 140° C. and particularly preferably 95to 120° C. can be applied in the separating device. The granules remain in the separating device for a maximum of 10 s, particularly preferably 0.1 to 3 s and especially preferably 0.1 to 2 s.

The separating device has at least one inlet opening for the insertion of the granulate into the unit. The inlet opening can be, for example, an opening in the housing or the outlet from a pipe that is led into the housing. Furthermore, the separating device has at least one discharge opening for the removal of the granulate from the unit. The discharge opening can be, for example, an opening in the housing or the entry into a pipe that is led out of the housing. Furthermore, the separating device has at least one discharge opening for the removal of the liquid cooling medium from the unit.

In the treatment space there is a gas phase which takes up the evaporating cooling medium. Preferably the gas is air. However, other gases or gas mixtures with a lower oxygen content than air can also be used.

The separating device is preferably not a closed unit. The separating device preferably has at least one outlet for the discharge of gas, preferably air. Preferably, the outlet opening of the separating device opens into a gas discharge pipe in which a fan is arranged for air circulation through the separating device. Optionally, the outlet opening is connected to a condenser for recovering liquid cooling medium from the discharged gas.

The separating device may also have at least one inlet opening for the introduction of gas, preferably air. In this case, the inlet opening is preferably located at the end of the treatment space opposite to the outlet opening to ensure that gas flows completely through the treatment space. However, it is also possible that the inlet opening for the introduction of gas is not located in the separating device, but in a downstream unit or a connecting line to a downstream unit.

According to one embodiment, the gas is fed to the inlet opening via an intake filter. In the gas line leading to the inlet opening, a fan can be provided to circulate air through the separating device. This fan can be provided in addition to the fan in the gas discharge pipe or can take its place.

The pipe leading to the inlet opening and the pipe leading from the outlet opening can be connected together to form a closed circuit. According to this embodiment, however, the gas must be passed through a condenser before re-entering the treatment space in order to separate the evaporated cooling medium contained in the gas.

The device according to the present invention preferably has a cooling medium circuit. The cooling medium is fed from a storage container (tank) preferably via a circulating pump and, optionally, a heat exchanger (for optional heating or cooling of the cooling medium) into the moulding unit (granulation device). The cooling medium separated in the separating device or an optional condenser can be fed back into the storage tank via a pipeline.

According to the present invention, the polyolefin granulate is quickly separated from the liquid cooling medium from the granulation stage after its production, so that immediately after the separation of the cooling medium, it has a temperature T2 which is above the temperature T1 of the liquid cooling medium.

According to the present invention, the polyolefin granulate preferably exhibits a temperature T2 directly after separation of the cooling medium, which is in the range of 71° C.-200° C., preferably 80° C.-160° C. and in the case of polyethylene particularly preferably at 71°-120° C.

After separation of the liquid cooling medium, the polyolefin granulate is dry. According to the present invention, "dry" means that the granulate has a maximum residual moisture content of 2% by weight, preferably of 0.01-1.5% by weight and in particular preferably 0.01-1% by weight.

After separation of the polyolefin granules from the liquid cooling medium, they are transferred into the following unit, namely the treatment unit which comprises a treatment space. This is preferably achieved with the aid of a connecting line, which is arranged between the separating device and the treatment device and which connects the discharge opening of the separating device with the inlet opening of the treatment device.

The connecting line is designed in accordance with an embodiment of the present invention in such a way that an unhindered passage of the polyolefin granules to be treated from the upstream unit to the downstream unit is ensured.

According to another embodiment of the present invention, a sieve is arranged in the connecting line between the separating device and the treatment device, through which individual granules of a size according to the specifications can pass unhindered, but which retains granule agglomerates and excessively large granules.

According to another embodiment of the present invention, a shut-off unit, preferably a sluice unit such as a rotary air lock unit, or a slide valve, or a start-up diverter, is arranged in the connecting line between the separating device and the treatment device.

According to another embodiment of the present invention, several of the aforementioned units from the group consisting of screen, sluice unit such as a rotary air lock unit, slide valve, and start-up diverter are arranged in the connecting line between separating device and treatment device.

The granulate in the connecting pipes can be conveyed either by free fall (i.e. due to the force of gravity in a vertical or inclined pipe), mechanically or preferably pneumatically. According to a particularly preferred embodiment of the present invention, the pneumatic conveying of the granules through the connecting pipes is effected by means of dense-flow conveying with a conveying speed of 1-8 m/s, or alternatively by means of thin-flow conveying with a conveying speed of 10-18 m/s. It is preferable to heat the conveying gas before it comes into contact with the polyolefin granulate in order to prevent excessive cooling of the polyolefin granulate during conveying. Optionally, the conveying gas is heated in such a way that the polyolefin granulate has a higher temperature at the exit from the conveyor than at the entrance into the conveyor.

Preferably, the temperature of the conveying gas is in the range of 60 to 200° C., for polyethylene especially in the range of 60 to 160° C., preferably 70 to 120° C., for polypropylene especially in the range of 80 to 180° C., preferably 90 to 160° C.

The polyolefin granulate then enters a treatment space, which is arranged in a treatment device. In this treatment space, the volatile components are efficiently removed from the polyolefin granulate.

According to the present invention, the polyolefin granules preferably flow through the treatment space essentially from top to bottom, while a treatment gas flows through the treatment space in counter-current or alternatively in cross-current or a combination of counter-current and cross-current.

As treatment gases, for example, air, steam or inert gases such as nitrogen, noble gases such as argon, or $CO_2$ can be used. The treatment gas may comprise a mixture of several treatment gases. The treatment gas may contain additives which assist in the removal of volatile components. According to the present invention, the preferred treatment gas is air. The air used can be ambient air drawn in, air from a compressed air network, usually with a dew point below 10° C., or air from a dry air generator, usually with a dew point below −10° C.

The treatment device with treatment space can basically be any unit in which a granulate treatment with a gas can be performed.

In other words, the process according to the present invention can be carried out with any unit in which the conditions according to the present invention can be set.

According to the present invention, the treatment device is preferably arranged with a treatment space below the separating device.

The treatment space is surrounded by a housing. The horizontal cross-section of the treatment space can have any shape, but is preferably round or rectangular. The treatment space is preferably arranged essentially vertically, and particularly preferably exactly vertically, so that the granulate can flow through the device from top to bottom in the form of a moving fixed bed. It is important that a uniform product flow can be achieved. The treatment space is laterally limited by a jacket. The jacket wall can consist of cylindrical, conical or a combination of conical and cylindrical segments, wherein the gas velocity distribution can be influenced over the height of the device. A constriction in the ceiling area allows an increase of the gas velocity, which leads to local turbulence, resulting in an improved product distribution.

A particular embodiment of the present invention provides for an at least approximately rotationally symmetrical housing jacket, giving rise to advantages concerning its production as well as to advantages for a regular product flow.

Inside the treatment space, displacement bodies can be arranged through which the granulate cannot protrude and which thus reduce the treatment space. Such displacement bodies can be used, for example, to feed treatment gas, to adjust the free crosssectional area or to improve the granulate flow.

Inside the treatment space, partitions can be arranged to divide the treatment space into two or more chambers. The chambers can be connected to each other by passage openings for the granules.

Preferably, at least one inlet opening opens into the ceiling area of the treatment space and allows the granulate to be introduced into the treatment space. The inlet opening can be, for example, an opening in the housing or the outlet from a pipe that is led into the housing. The inlet opening can be divided into several segments, which allows the granules to be distributed in the treatment space.

Preferably, at least one discharge opening opens into the lower part of the treatment space, through which treated granulate can be discharged from the treatment space. The discharge opening can be, for example, an opening in the housing or the entry into a pipe that is led out of the housing. Usually the granulate is led to the discharge opening through a conical area. The angle of the discharge cone to the horizontal is preferably 50-80° if the granules are not fluidized or vibrated in the discharge cone, and 15-60°, especially 30-50° if the granules are fluidized or vibrated in the discharge cone. Alternatively, the granulate can also be led to the discharge opening by means of a mechanical discharge device, such as a screw.

According to a preferred embodiment of the present invention, a shut-off unit, preferably a sluice unit, such as a rotary air lock unit, a slide valve or a roller unit, is located below the discharge opening. The filling level of the granulate in the treatment space or the weight of the granulate in the treatment device comprising the treatment space can serve as a control variable.

At least one supply device and at least one discharge device for a treatment gas lead to the treatment space of the device according to the present invention. Each supply device has at least one inlet opening through which treatment gas flows into the treatment space. Each discharge device has at least one outlet opening through which treatment gas flows out of the treatment space.

The supply device can be located in the jacket or preferably in the floor area of the treatment space. The discharge device can be located in the jacket or preferably in the ceiling area of the treatment space.

A particular embodiment provides that a discharge device for the treatment gas is integrated into the inlet opening of the polyolefin granules.

A particular embodiment of the present invention provides that the treatment space is partially limited at the bottom by a gas-permeable shut-off device, in particular a perforated plate with a plurality of inlet openings, through which treatment gas can flow at least partly, but not the granules. For this purpose the openings are smaller than the diameter of the granules. The passage area is preferably between 1% and 30%. Preferred are openings between 20 and 90%, especially between 30 and 80% of the diameter of the granules. The number, size and arrangement of the openings can be uniform or non-uniform. The shut-off device is arranged conically or sloped to the bottom, wherein the angles described for the outlet cone are also valid here.

The treatment gas flowing through the treatment space serves to efficiently remove volatile components from the polyolefin granulate. Heating of the polyolefin granulate in the treatment space is not planned respectively is not implemented. According to the present invention, heating of the polyolefin granulate in the treatment space can be dispensed with because the polyolefin granulate on entering the treatment space has sufficient latent heat for efficient removal of volatile components. According to the present invention, this is achieved as described above by carrying out, on the one hand, the granulation with a hot liquid cooling medium and, on the other hand, subsequently drying the polyolefin granules quickly by separating the liquid cooling medium. In this way, excessive cooling of the polyolefin granulate is prevented.

According to the present invention, at least 75% of the dry polyolefin granules in the treatment space have a temperature $T3$ which is in a range of $T2\pm20°$ C., preferably $T2-20°$ C. to $T2+5°$ C. and even more preferably $T2-15°$ C. to $T2$, but below the melting point of the granules, since melting of the material in the treatment space is obviously undesirable.

Since heating of the polyolefin granulate in the treatment space is undesirable and should not be carried out, either comparatively cool treatment gas or only a comparatively small amount of treatment gas is fed into the treatment space. Preferably, the treatment gas, when entering the treatment space, either has a temperature $T4$ below the temperature $T2$ of the dry polyolefin granules, or it is introduced into the treatment space in an amount which is less than half the throughput of polyolefin granules through the treatment space.

Thus, a temperature profile is established in the treatment space, wherein a uniform temperature prevails in the inlet area. Due to heat losses, an outer layer in the region of the reactor wall cools down slightly, wherein the temperature difference between the material in the centre and the material at the edge increases with increasing residence time, and thus with increasing approach to the exit area from the treatment space. In the outlet area of the treatment space, further cooling may occur due to the treatment gas supplied. Alternatively, a slight heating of the material can be achieved by the supplied treatment gas, wherein preferably the temperature in the inlet area into the treatment space is not exceeded. According to the present invention, the treatment space should be designed in such a way that at least 75%, in particular at least 85%, of the polyolefin material in the treatment space is within the range of temperaature $T3$. For this purpose, as described above, the amount and temperature of the supplied treatment gas are selected in such a way that the treatment gas causes only a slight change in the temperature of the polyolefin material, and/or cold treatment gas is supplied at a position near the outlet opening from the treatment space, wherein only a small proportion of the polyolefin material in the treatment space is cooled. Furthermore, the treatment space should be insulated or equipped with an active jacket heating system so that heat losses can be kept low.

According to the present invention, it is preferred that the dry polyolefin granulate remains in the treatment space for a period of 0.5 to 20 h, preferably 1 to 10 h, particularly preferably 2 to 6 h.

If the treatment gas is led in counter-flow, the cross-sectional area of the treatment space is preferably designed in such a way that an upwardly directed gas flow with a superficial space velocity of 0.05 to 0.8 m/s, in particular 0.1 to 0.7 m/s, is established. If the treatment gas is led in counter-current, superficial space velocities in the range of 0.2 to 4.0 m/s, especially from 0.3 to 3.0 m/s are preferred.

According to one embodiment of the present invention, the dry polyolefin granulate is treated in the treatment space under increased pressure, preferably under an excess pressure of 0.1 to 990 mbar, more preferably under an excess pressure of 20 to 500 mbar. Here, excess pressure is understood to be the pressure applied in addition to atmospheric pressure (1 bar), so that according to this embodiment the pressure in the treatment space expressed as absolute pressure is 1.0001 to 1.99 bar, preferably 1.02 to 1.5 bar.

According to an alternative embodiment of the present invention, the dry polyolefin granulate is treated in the treatment space under reduced pressure, preferably under a reduced pressure of 0.1 to 999 mbar, more preferably under a reduced pressure of 10 to 900 mbar, particularly preferably under a reduced pressure of 20 to 500 mbar. In this context, reduced pressure is understood to mean the pressure reduced in comparison with atmospheric pressure (1 bar), so that according to this embodiment the pressure in the treatment space expressed as absolute pressure is 0.9999 to 0.001 bar, more preferably 0.99 to 0.1 bar and particularly preferred 0.98 to 0.5 bar.

According to a preferred embodiment, the reduced pressure in the treatment space is selected in such a way that a pneumatic suction conveyor can be operated and the material is fed therewith into the treatment space. In this case a reduced pressure of 50 to 400 mbar, in particular 70 to 300 mbar is preferred, so that according to this embodiment the absolute pressure in the treatment space is 0.95 to 0.6 bar, preferably 0.93 to 0.7 bar.

Optionally, the treatment gas used is at least partially conducted in a circulation system, wherein a small amount of exchange gas can be added and removed, respectively. According to this preferred embodiment, there is an essentially closed circuit of pipes between the discharge device and the supply device for the treatment gas.

The circuit may include other units such as pumps, compression devices (e.g. fans, blowers or compressors), heat exchangers (e.g. heaters), shut-off devices (e.g. a valve or tap) or cleaning devices (e.g. filters, cyclones, scrubbers or catalytic combustion devices). According to a preferred embodiment of the present invention, the treatment gas is cleaned with a liquid, preferably water, after leaving the treatment space.

According to a preferred embodiment of the present invention, after leaving the treatment space, the polyolefin granulate is cooled if necessary and, optionally is passed through a classifying screen downstream of the treatment space, in order to remove any abrasion particles from the conveying (dust, threads, also angel hair or streamers).

With the process according to the present invention, the proportion of volatile components in the polyolefin granulate can be significantly reduced. According to the present invention, the proportion of volatile components in the polyolefin granulate is preferably reduced by at least 90%, more preferably by at least 95% and in particular preferably by at least 99%. The polyolefin granulate purified by the process according to the present invention has volatile components only in the ppm range.

The process according to the present invention is preferably carried out continuously.

The polyolefin granulate purified by the process according to the present invention can then be processed into new plastic articles in the usual way. Appropriate processing devices are known to the skilled person and can be arranged directly after the treatment device according to the present invention.

The process of the present invention can be carried out in an apparatus comprising
an extrusion device,
a granulation device after the extrusion device, preferably an underwater granulation device,
a drying device after the granulation device, preferably a centrifugal separator
a treatment device with a treatment space, the treatment device having a material inlet, a material outlet, a gas inlet and a gas outlet, the treatment device preferably additionally comprising a vacuum pump,
and connecting units between the above devices for trans-porting material.

Preferably, the extrusion device is equipped with a melt filter.

Furthermore, a start-up diverter and a rotary valve are preferably arranged in the connecting unit between the drying device and the treatment device.

Particularly preferred, the process according to the present invention can be carried out in in a device comprising
an extrusion device with melt filter,
an underwater granulation device after the extrusion device,
a drying device in the form of a centrifugal dryer,
a connecting line between the centrifugal dryer and the treatment device, the connecting line having a start-up diverter and a rotary air lock unit following thereafter,
a treatment device with a treatment space, wherein the treatment device has a material inlet, a material outlet, a gas inlet and a gas outlet as well as a pump, preferably a water ring vacuum pump, and the treatment space is flowed through by the treatment gas in counter-current to the direction of flow of the granulate,
a rotary air lock unit at the material outlet of the treatment device.

Figure 2:
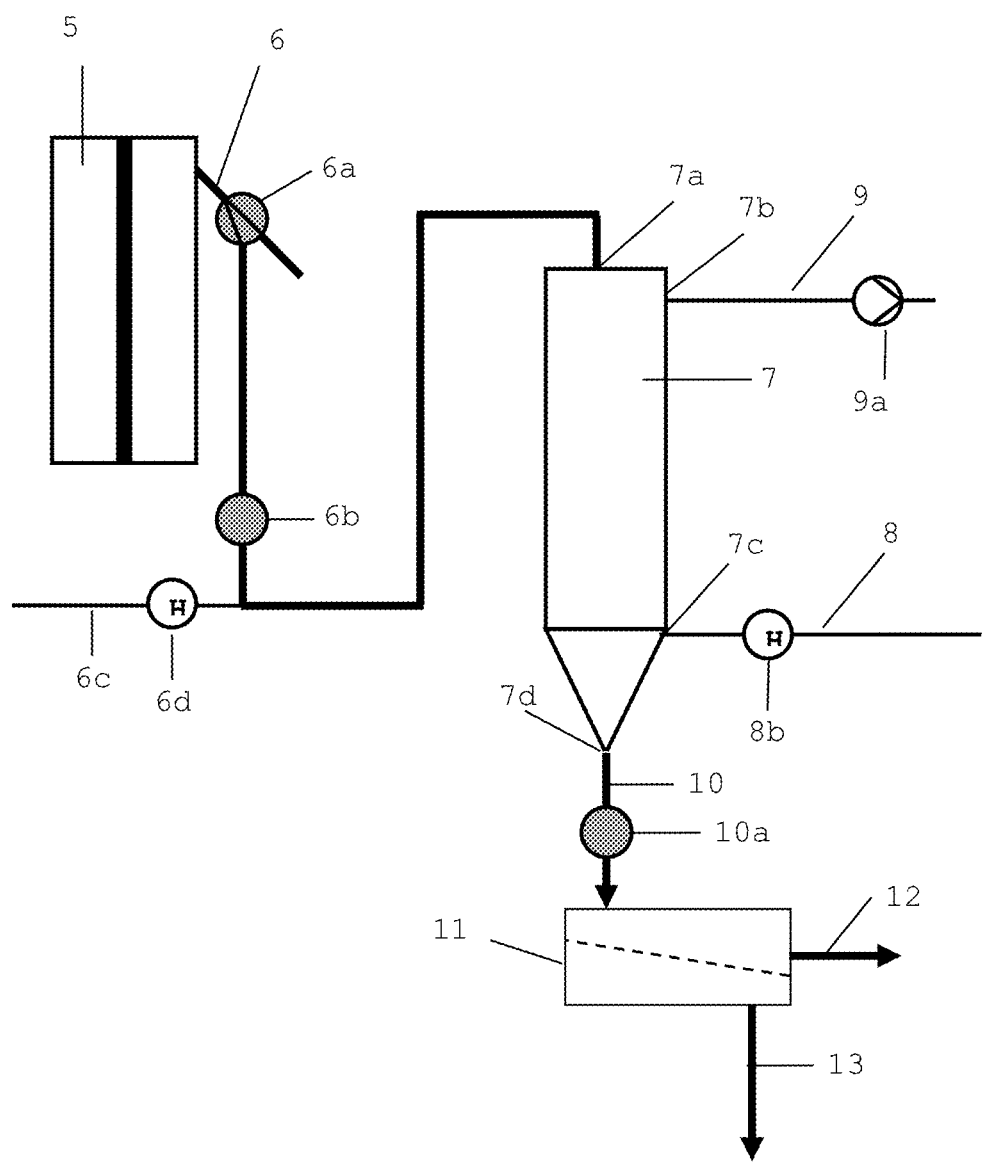

The present invention is further described by means of non-limiting drawings. It is shown:

FIG. 1 a schematic representation of a device for carrying out the method according to the present invention FIG. 2 a schematic representation of a further embodiment of a device for carrying out the method according to the present invention Identical units are indicated in the figures by identical reference numbers.

The device according to FIG. 1 has a reactor 1 for the production of a polymer melt. According to the present invention, reactor 1 is also a device for melting a solid product such as used polyolefin material. In this case, reactor 1 can be an extruder as an example.

The molten polyolefin material is transferred to a granulation device 2. In the granulation device 2, a granulate is produced from the molten material in a known manner. For example, it can be an underwater granulator (as shown in FIG. 1). In this case, the granulation is carried out under water. The granulate particles obtained are cooled down simultaneously in the granulation device 2. As explained above, however, the cooling must not be so strong that the granulate particles are cooled below a temperature T2. This can be achieved by using heated water which has a temperature T1 in the range of 50 to 100° C., preferably 70 to 100° C., even more preferably 75 to 95° C. and especially preferably 80 to 90° C. The granules should be cooled to a temperature in the range of 71° C.-200° C., preferably 80° C.-160° C. and in the case of polyethylene especially preferably 71°-120° C.

The granulate is transferred via a connecting line 3 into a unit for drying the granulate (separating device) 5. To avoid excessive cooling of the pellets, they should be led out of the granulation device 2 and through the connecting line 3 as quickly as possible. Preferably, the flow velocity in connection line 3 can be increased by introducing a gas stream (preferably air).

In the unit for drying the granulate (separating device) 5 the granulate is separated from the liquid cooling medium (water) and dried. The separated cooling medium is led back via a pipeline 4a into a storage tank 4b for the cooling medium. The reservoir tank 4b has an inlet 4e for the supply of cooling medium. From the storage tank 4b the cooling medium is transferred to the granulation device 2 by means of a circulating device (pump) 4c. Here the cooling medium preferably passes through a heat exchanger 4d. In the heat exchanger 4d the cooling medium can be heated or cooled, as required. Especially cooling medium returned from separating device 5 can have a too high temperature, due to contact with hot granules, and must be cooled before entering granulation device 2.

The fresh cooling medium supplied via inlet 4e may contain a basic medium or a pH buffer medium. In particular, the use of water with a neutralisation or buffering effect set within a narrow range is provided here. Alternatively, a basic medium or a pH buffer medium can be added directly into the cooling circuit, e.g. into storage tank 4b.

In addition to a mechanical separating device, the granulate in unit 5 is dried by means of gas, preferably air or a gas atmosphere essentially comprising air, at a temperature of 100 to 200° C., preferably 110 to 160° C. In the device according to FIG. 1, the air is led through an inlet opening 5a into the separating device 5. The inlet opening 5a for the gas can be located in the housing of the separating device 5 or in the connecting line 6, or both. Optionally, an intake filter (not shown) can be installed in the gas line leading to inlet opening 5a. The air leaves the separating device 5 through the outlet pipe 5b. In the device according to FIG. 1, a fan 5c is arranged in the outlet pipe 5b for the circulation of air through the separating device 5. Alternatively, the fan could be located in the air inlet line 5a. Furthermore, inlet opening 5a and outlet line 5b could be connected to each other to form a circulation system. A condenser must then be provided in this circulation system.

The granulate is transferred from the separating device 5 via a connecting line 6 through an inlet opening 7a into a unit 7 with a treatment space. A start-up diverter valve 6a with discharge line is provided in the connecting line 6.

In unit 7, the polyolefin granulate is treated according to the present invention. Inside the treatment space of unit 7, the granulate particles are heat treated by a gas stream passing through unit 7 in counter-current or cross-current. Within the treatment space of unit 7 the conditions of a fixed bed are present.

At least 75% of the dry polyolefin granules in the treatment space of unit 7 have a temperature T3, which is within a range of T2±20° C., but below the melting point of the granules.

Preferably the treatment gas introduced into unit 7 is air. The treatment gas, preferably when entering the treatment space, either has a temperature T4 below the temperature T2 of the dry polyolefin granules, or the gas is introduced into the treatment space in an amount which is less than half the throughput of polyolefin granules through the treatment space.

The dry polyolefin granulate remains in the treatment space of unit 7 for a period of 0.5 to 20 h, preferably 1 to 10 h, particularly preferably 2 to 6 h.

The cleaned granulate leaves unit 7 through a discharge opening 7d and a discharge line 10, preferably via a discharge device 10a, for example a shut-off unit such as a rotary air lock unit.

The process gas enters the unit 7 through an inlet opening 7c and leaves the unit 7 through an outlet opening 7b into a gas discharge line 9. In the supply line 8 of the process gas there is a blower 8a, for example a fan, for circulation of the gas. A heat exchanger 8b is provided upstream of the inlet opening 7c to bring the gas to the desired temperature before entering unit 7. However, the process gas used in unit 7, preferably air, can also be fed through a closed circuit system of pipes 8, 9.

With the device according to FIG. 1, it is possible, by accordingly adjusting the amount of gas introduced, to treat the dry polyolefin granulate in the treatment space of unit 7 under increased pressure, preferably under an excess pressure of 0.1 to 990 mbar, more preferably under an excess pressure of 20 to 500 mbar.

FIG. 2 shows a further embodiment of a device suitable for the invention. According to this embodiment, the dried polyolefin granulate is not conveyed directly from unit 5 to unit 7, but is instead fed to a shut-off unit 6b such as a rotary air lock unit after the start-up diverter 7. Heated conveying gas is fed through a conveying gas line 6c and a device 6d for heating the conveying gas, for example a heat exchanger, in order to pneumatically convey the granulate into unit 7 after leaving the rotary air lock unit 6b.

In the embodiment according to FIG. 2 a pump 9a, preferably a vacuum pump, is arranged in the gas discharge line 9. In this way, by removing at least part of the gas atmosphere from the treatment space of unit 7 by means of pump 9a, it is possible for the dry polyolefin granules to be treated in the treatment space of unit 7 under reduced pressure, preferably under a reduced pressure of 0.1 to 999 mbar, more preferably under a reduced pressure of 10 to 900 mbar, particularly preferably under a reduced pressure of 20 to 500 mbar. At the same time pump 9a can be used for conveying the gas.

In the embodiment shown in FIG. 2, after leaving unit 7 through the shut-off unit 10a, preferably a rotary air lock unit, the cleaned polyolefin granulate is passed through a separating device 11, preferably a classifying screen. Oversized particles separated in this process are removed from the product stream through a discharge line 12, while the purified polyolefin granulate is passed through a discharge line 13.

The invention claimed is:

1. A process for recycling polyolefins, the process comprising the steps of:
   a) extruding a used polyolefin material,
   b) producing granules from the polyolefin material emerging from the extrusion into a liquid cooling medium,
   c) separating the cooling medium to obtain dry polyolefin granules, and
   d) treating the dry polyolefin granules in a treatment space with a treatment gas to remove volatiles,
   wherein carrying out the process in such a way that the dry polyolefin granules, directly after separation of the cooling medium in step c), still have a granule temperature (T2) which is above a temperature of the liquid cooling medium (T1) in step b) and is in the range of 71° C.-200° C., but below a melting point of the dry polyolefin granules, and at least 75% of the dry polyolefin granules, in the treatment space, have a treatment space temperature (T3) which is in the range of the granule temperature (T2) ±20° C., but below the melting point of the dry polyolefin granules.

2. The process according to claim 1, wherein the liquid cooling medium in step b) is water.

3. The process according to claim 1, wherein step c) is carried out in a centrifugal dryer.

4. The process according to claim 2, wherein step c) is carried out in a centrifugal dryer.

5. The process according to claim 1, wherein the treatment gas in step d) is air.

6. The process according to claim 1, wherein the treatment gas, on entering the treatment space, either has a gas temperature (T4) below the granule temperature (T2) of the dry polyolefin granules, or is introduced into the treatment space in an amount corresponding to less than half a throughput of polyolefin granules through the treatment space.

7. The process according to claim 1, wherein the dry polyolefin granules remain in the treatment space for a period of 0.5 to 20 hours.

8. The process according to claim 1, wherein the dry polyolefin granules are treated in the treatment space at an elevated pressure.

9. The process according to claim 1, wherein the dry polyolefin granules are treated in the treatment space at a reduced pressure.

10. The process according to claim 1, wherein the treatment gas, after leaving the treatment space, is cleaned with a liquid.

11. The process according to claim 1, wherein the temperature (T1) of the liquid cooling medium, in step b), is in a range from 50 to 100° C.

12. The process according to claim 1, wherein a contact time of granulate and liquid cooling medium is at most 10 seconds.

13. The process according to claim 1, wherein components are removed during extruding by one of melt degassing and/or filtration.

14. The process according to claim 1, wherein the polyolefin material is pretreated prior to extrusion, and the pre-treatment is selected from the group consisting of sorting by colour, sorting by polymer type, comminution, surface cleaning, pre-drying, and combinations thereof.

15. The process according to claim 1, wherein transfer of the dry polyolefin granules into the treatment space is effected by pneumatic conveying.

* * * * *